(12) United States Patent
Yoo et al.

(10) Patent No.: US 11,436,848 B2
(45) Date of Patent: Sep. 6, 2022

(54) AUTOMATIC LABELING APPARATUS AND METHOD FOR OBJECT RECOGNITION

(71) Applicant: LG ELECTRONICS INC., Seoul (KR)

(72) Inventors: Seongmock Yoo, Seoul (KR); Seung-Kyun Oh, Seoul (KR); Jinseok Im, Seongnam-si (KR); Sanghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 16/865,986

(22) Filed: May 4, 2020

(65) Prior Publication Data
US 2021/0165996 A1 Jun. 3, 2021

(30) Foreign Application Priority Data
Nov. 29, 2019 (KR) ........................ 10-2019-0157051

(51) Int. Cl.
*G06V 20/64* (2022.01)
*G06K 9/62* (2022.01)
(Continued)

(52) U.S. Cl.
CPC ........... *G06V 20/64* (2022.01); *G06K 9/6256* (2013.01); *G06N 3/08* (2013.01); *G06V 20/20* (2022.01)

(58) Field of Classification Search
CPC ........ G06V 20/64; G06V 20/20; G06V 20/46; G06V 20/41; G06V 20/56; G06V 20/52; G06V 20/58; G06V 10/10–20; G06K 9/6256; G06K 9/62; G06K 9/6201; G06K 9/6262; G06K 9/6232; G06K 9/6257; G06K 9/6265; G06K 9/6267; G06K 9/6271; G06N 3/08; G06N 3/0445; G06N 3/0454; G06N 3/0472; G06N 3/003; G06N 3/02; G06N 3/04; G06N 3/0481; G06N 3/084; G06N 5/003; G06N 7/005; G06N 20/10;
(Continued)

(56) References Cited

U.S. PATENT DOCUMENTS 10,825,188 B1 * 11/2020 Tan .......................... G06T 7/73
10,867,182 B2 * 12/2020 Chen ........................ G06T 7/70
(Continued)

*Primary Examiner* — Michael S Osinski
(74) *Attorney, Agent, or Firm* — Lee, Hong, Degerman, Kang & Waimey PC

(57) ABSTRACT

An automatic labeling apparatus for object recognition and a method therefor are provided. The automatic labeling apparatus for object recognition is configured to apply an object recognition algorithm to each of a plurality of image frames so as to recognize an object, and in response to a determination that an object recognition result in at least one first image frame among the image frames corresponds to a predetermined error condition, automatically generate a data set on an object which is a target of object recognition by using an object recognition result of a second image frame other than the first image frame among the image frames and an object image of the first image frame. The object recognition algorithm, which is a neural network model generated through machine learning, may be stored in a memory or provided through a server in an artificial intelligence environment through a 5G network.

16 Claims, 5 Drawing Sheets

(51) Int. Cl.
*G06N 3/08* (2006.01)
*G06V 20/20* (2022.01)

(58) Field of Classification Search
CPC . G06T 2207/10016; G06T 2207/20081; G06T 2207/20084; G06T 2207/30196; G06T 2207/30201; G06T 2207/30232; G06T 7/11; G06T 7/20; G06T 7/248

See application file for complete search history.

(56) References Cited

U.S. PATENT DOCUMENTS

| | | | | |
|---|---|---|---|---|
| 10,891,518 B1* | 1/2021 | Joshi | .................. | G01S 17/89 |
| 11,212,348 B2* | 12/2021 | Dachille | ............. | H04L 67/1097 |
| 2007/0250898 A1* | 10/2007 | Scanlon | ................ | G06V 20/52 |
| | | | | 725/135 |
| 2018/0232602 A1* | 8/2018 | Dey | ................... | G06F 16/5854 |
| 2018/0373980 A1* | 12/2018 | Huval | .................. | G06V 20/58 |
| 2019/0138816 A1* | 5/2019 | Li | ......................... | G06V 20/46 |
| 2019/0354746 A1* | 11/2019 | Zhang | .................... | G06T 7/593 |
| 2019/0377959 A1* | 12/2019 | Marano | ................. | G06Q 50/30 |
| 2019/0392242 A1* | 12/2019 | Tariq | ........................ | G06T 7/10 |
| 2020/0057442 A1* | 2/2020 | Deiters | .............. | B60W 60/001 |
| 2020/0097728 A1* | 3/2020 | Croxford | .............. | G06K 9/627 |
| 2020/0134875 A1* | 4/2020 | Yi | .......................... | G06V 40/10 |
| 2020/0143561 A1* | 5/2020 | Hallett | ...................... | G06T 7/73 |
| 2020/0151448 A1* | 5/2020 | Lin | ........................... | G06N 3/04 |
| 2020/0175279 A1* | 6/2020 | Chen | ........................ | G06T 7/70 |
| 2020/0356782 A1* | 11/2020 | Liu | .......................... | H04N 21/84 |
| 2021/0042592 A1* | 2/2021 | Hashimoto | .......... | G06V 30/248 |
| 2021/0097398 A1* | 4/2021 | Snell | .................... | G06K 9/6267 |
| 2021/0117725 A1* | 4/2021 | Wang | .................. | G06N 3/0454 |
| 2021/0174072 A1* | 6/2021 | Zhang | ................. | G06V 40/176 |
| 2021/0201007 A1* | 7/2021 | Shibata | ................. | G06V 40/10 |
| 2021/0224998 A1* | 7/2021 | Zhang | ................. | G06K 9/6272 |
| 2021/0228022 A1* | 7/2021 | Liu | ...................... | A47J 37/041 |
| 2021/0295536 A1* | 9/2021 | Yang | ........................ | G06N 3/08 |
| 2021/0334604 A1* | 10/2021 | Yu | ........................ | G06K 9/6257 |
| 2021/0343036 A1* | 11/2021 | Goto | .......................... | G06T 7/207 |

* cited by examiner

AUTOMATIC LABELING APPARATUS AND METHOD FOR OBJECT RECOGNITION

CROSS-REFERENCE TO RELATED APPLICATION

Pursuant to 35 U.S.C. § 119(a), this application claims the benefit of earlier filing date and right of priority to Korean Patent Application No. 10-2019-0157051, filed on Nov. 29, 2019, the contents of which are hereby incorporated by reference herein in its entirety.

BACKGROUND

1. Technical Field

The present disclosure relates to an automatic labeling apparatus for object recognition and a method therefor, and more specifically, to a technique for acquiring an object recognition result of an image frame in which an object is not successfully recognized, based on an object recognition result of an image frame in which the object is successfully recognized, and automatically generating a data set on the object based on the acquired object recognition result.

2. Description of Related Art

Generally, deep learning is defined as a set of machine learning algorithms which attempts a high level of abstraction through a combination of several nonlinear transformations. Broadly, deep learning is a field of machine learning which teaches computers to think like humans do.

Many studies are being conducted in order to represent data in a form which can be understood by a computer, and apply the data in learning. As a result of these efforts, development of deep learning techniques is actively proceeding, and deep learning techniques are being applied to various fields (for example, image recognition, speech recognition, and natural language processing).

The deep learning may be trained for accuracy in a learning step using big data. However, when an object recognition algorithm generated as a result of the deep learning is applied in an inference step, for example, if an image frame which has not been previously learned is received, an unexpected error may occur (for example, an object may not be recognized, or another type of object may be recognized). In this case, reliability of the object recognition result using the object recognition algorithm may be reduced, and a user may experience the inconvenience of having to intervene to solve this problem by designating (or recording), one by one, a type of object for the image frames in which the error has occurred.

Accordingly, there is a need for a technique capable of more easily generating a data set for an object which is a target of object recognition, even when an unexpected error occurs upon application of the object recognition algorithm to an image frame, by using an object recognition result of applying the object recognition algorithm to another image frame.

SUMMARY OF THE INVENTION

An aspect of the present disclosure is to automatically generate, without a user's intervention, a data set on an object which is a target of object recognition, upon an error being generated due to reception of an image frame which has not been previously learned when an object recognition algorithm is applied in an inference step, by using an object recognition result (for example, a type of the object) in which the object recognition algorithm is applied to another image frame adjacent to the image frame (for example, an image frame received within a predetermined time interval based on when the image frame is received).

Another aspect of the present disclosure is to additionally generate a data set on a moving object upon an error being generated as a result of applying an object recognition algorithm to an image frame in which the moving object is photographed, by using an object recognition result (for example, a type of the object and a location of a region where the object is recognized) in which the object recognition algorithm is applied to another image frame adjacent to the image frame to acquire a type of the object and a location of a predicted region in which it is estimated that the moving object will exist in the image frame, and by using the acquired type of the object and location of the predicted region.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is understood that the aspects and advantages of the present disclosure may be embodied by the means and a combination thereof in claims.

An apparatus for object recognition according to an embodiment of the present disclosure may include a receiver configured to receive a plurality of image frames, and one or more processors configured to perform image recognition on the received plurality of image frames using an object recognition algorithm, determine that an object recognition for a first image frame of the received plurality of image frames includes a predetermined error condition, where a target object is recognized in a second image frame of the received plurality of image frames, and generate a data set on the target object using the first image frame and the object recognition result of the second image frame.

A method for object recognition according to another embodiment of the present disclosure may include receiving a plurality of image frames, performing image recognition on the received plurality of image frames using an object recognition algorithm, determining that an object recognition result for at least a first image frame of the received plurality of image frames includes a predetermined error condition, where a target object is recognized in a second image frame of the received plurality of image frames, and generate a data set on the target object using the first image frame and the object recognition result of the second image frame.

Apart from those described above, another method and another system for implementing the present disclosure, and a computer-readable recording medium having a computer program stored therein to perform the method may be further provided.

Other aspects and features in addition as those described above will become clear from the accompanying drawings, claims, and the detailed description of the present disclosure.

According to the present disclosure, it is possible to automatically generate, without a user's intervention, a data set on an object which is a target of object recognition, upon an error being generated due to reception of an image frame which has not been previously learned when an object recognition algorithm is applied in an inference step, by using an object recognition result (for example, a type of the object) in which the object recognition algorithm is applied to another image frame adjacent to the image frame (for example, an image frame received within a predetermined time interval based on when the image frame is received).

Further, according to the present disclosure, it is possible to additionally generate a data set on a moving object upon an error being generated as a result of applying an object recognition algorithm to an image frame in which the moving object is photographed, by using an object recognition result (for example, a type of the object and a location of a region where the object is recognized) in which the object recognition algorithm is applied to another image frame adjacent to the image frame to acquire a type of the object and a location of a predicted region in which is estimated that the moving object will exist in the image frame, and by using the acquired type of the object and location of the predicted region.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. Like reference numbers and designations in the various drawings indicate like elements, in which:

DETAILED DESCRIPTION

Figure 1:
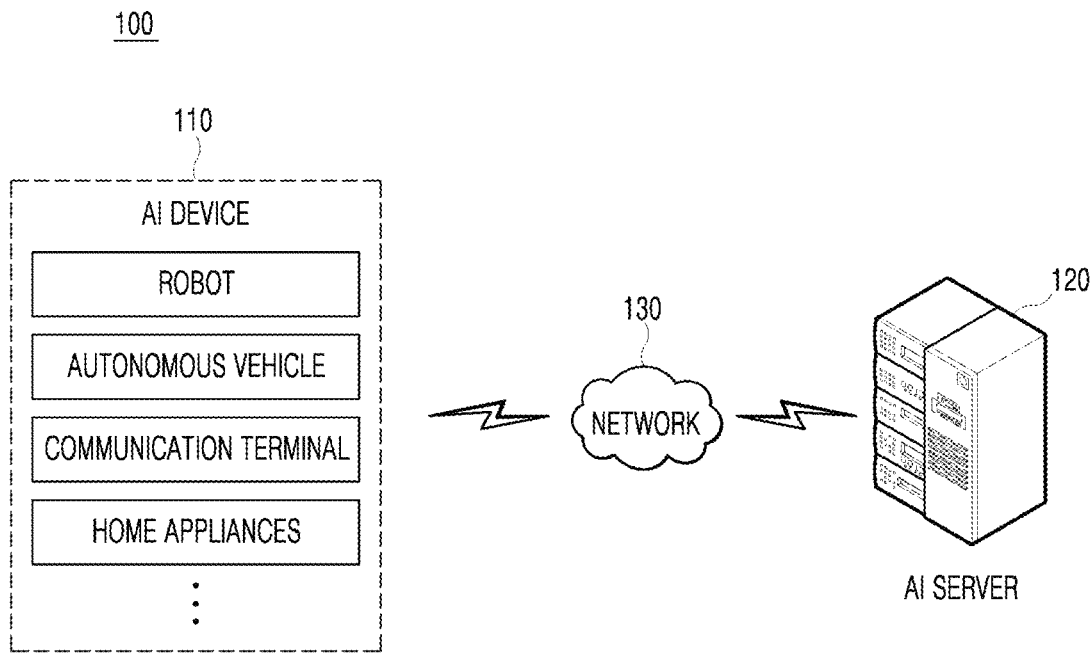
FIG. 1 is a diagram illustrating an example of an artificial intelligence (AI) system including an AI device, which includes an automatic labeling apparatus for object recognition, an AI server, and a network which connects the AI device and the AI server, according to an exemplary embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specifications, and overlapping descriptions of the elements will be omitted.

FIG. 1 is a diagram illustrating an example of an AI system including an AI device, which includes an automatic labeling apparatus for object recognition, an AI server, and a network which connects the AI device and the AI server, according to an exemplary embodiment of the present disclosure.

Referring to FIG. 1, an artificial intelligence (AI) system 100 includes an AI device 110, an AI server 120, and a network 130.

Referring to FIG. 1, the AI device 100 may include an automatic labeling apparatus for object recognition of the present disclosure, and may include, for example, at least one of a robot, an autonomous vehicle, a communication terminal (for example, a mobile phone, a smart phone, or a tablet PC), or a home appliance (for example, a robot cleaner).

The automatic labeling apparatus for object recognition based on artificial intelligence may train an artificial neural network (for example, an object recognition algorithm) by using a machine learning algorithm, or request an artificial neural network that has been trained by the AI server 120 and receive the trained artificial neural network from the AI server 120. When the automatic labeling apparatus for object recognition receives an image frame, the apparatus may also recognize a type of object in the received image frame by using the trained artificial neural network.

When the AI server 120 receives the request for the trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a partial configuration of the AI device 110, and may thus perform at least a portion of the AI processing together with the AI device 110.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluethooth®, a satellite communication, but the present disclosure is not limited to these examples. The network 130 may send and receive information by using short distance communication and/or long distance communication. The short-range communication may include Bluethooth®, radio frequency identification (RFID), infrared data association (IrDA), ultra-wideband (UWB), ZigBee, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as hubs, bridges, routers, switches, and gateways. The network 130 may include one or more connected networks, including a public network such as the Internet and a private network such as a secure corporate private network. For example, the network may include a multi-network environment. Access to the network 130 may be provided through one or more wire-based or wireless access networks. Furthermore, the network 130 may support the Internet of things (IoT) network of exchanging and processing information between distributed elements such as things, 3G, 4G, Long Term Evolution (LTE), 5G communications, or the like.

Figure 2:
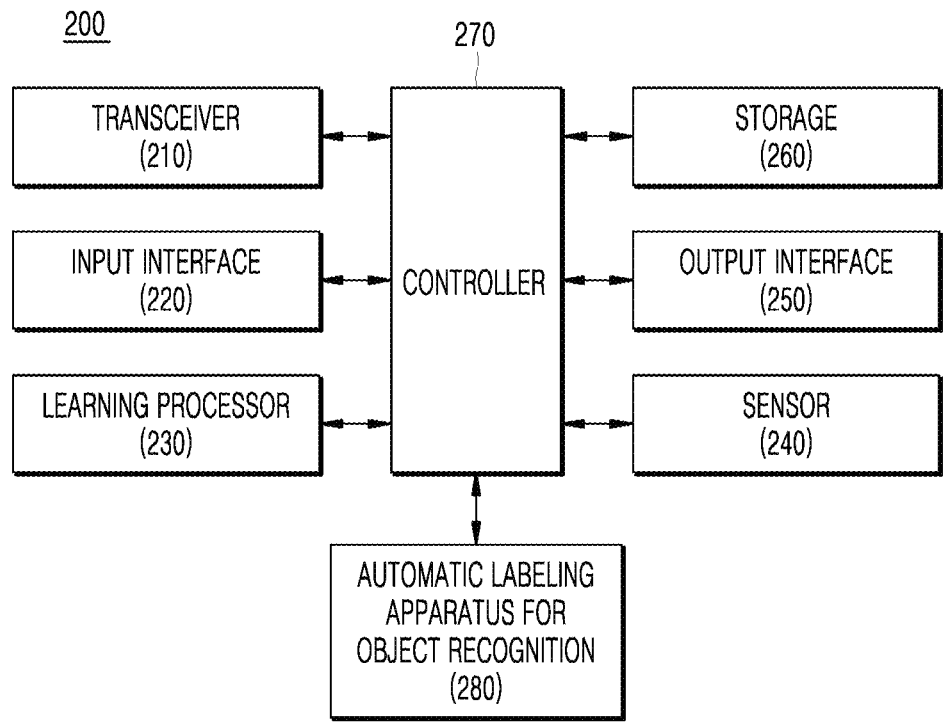
FIG. 2 is a diagram illustrating the configuration of the AI device which includes an automatic labeling apparatus for object recognition according to an exemplary embodiment of the present disclosure.

FIG. 2 is a diagram illustrating the configuration of the AI device which includes an automatic labeling apparatus for object recognition according to an exemplary embodiment of the present disclosure.

Referring to FIG. 2, an AI device 200 may include a transceiver 210, an input interface 220, a learning processor 230, a sensor 240, an output interface 250, a storage 260, a controller 270, and an automatic labeling apparatus 280 for object recognition.

The transceiver 210 may transmit or receive data to/from external devices such as other AI device or AI server using wireless/wired communication techniques. For example, the transceiver 210 may transmit or receive sensor data, user input, a trained model, a control signal, and the like with the external devices.

In this case, the communications technology used by the communicator 210 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input interface 220 may obtain various types of data. In this case, the input interface 220 may include a camera for inputting an image signal, a microphone for receiving an audio signal, and a user input interface for receiving information inputted from a user. Here, the camera or the microphone is treated as a sensor so that a signal obtained from the camera or the microphone may also be referred to as sensing data or sensor information.

The input interface 220 may obtain, for example, learning data for model learning and input data used when an output is obtained using a trained model. The input interface 220 may obtain raw input data. In this case, the controller 270 or the learning processor 230 may extract an input feature by preprocessing the input data.

The learning processor 230 may train a model, composed of an artificial neural network, to be trained using learning data. Here, the trained artificial neural network may be referred to as a trained model. The trained model may be used to infer a result value with respect to new input data rather than learning data, and the inferred value may be used as a basis for a determination to perform an operation. The learning processor 230 may perform AI processing together with a learning processor of the AI server.

Further, the learning processor 230 may include a memory which is integrated or implemented in the AI device 200, but is not limited thereto, and may be implemented using an external memory directly coupled to a storage 260 or the AI device 200 or a memory maintained in the external device.

The learning processor 230 may be implemented as a chipset of chips that include separate and multiple analog and digital processors. Also, the learning processor 230 may be implemented as dedicated hardware components (e.g., a deep learning processor using GPUs or ASICs). Also, the learning processor 230 may be implemented as CPUs, ASICs, FPGAs, microprocessors, and the like. In some cases, the controller 270 may be implemented as the learning processor, and the controller may be additionally configured according to the features of the learning processor as discussed herein.

The sensor 240 may obtain at least one of internal information of the AI device 200, surrounding environment information of the AI device 200, or user information by using various sensors. The sensor 240 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output interface 250 may generate a visual, auditory, or tactile related output. The output interface 250 may include a display outputting visual information, a speaker outputting auditory information, and a haptic module outputting tactile information.

The storage 260 may store data supporting various functions of the AI device 200. For example, the storage 260 may store input data, the learning data, the trained model, learning history, or the like, obtained from the input interface 220.

The storage 260 may serve to temporarily or permanently store data processed by the controller 270. Here, the storage 260 may include magnetic storage media or flash storage media, but the present disclosure is not limited thereto. The storage 150 may include an internal memory and/or an external memory. The storage 260 may include a built-in memory and/or an external memory, and may include a storage, for example, a volatile memory such as a DRAM, an SRAM, or an SDRAM, a non-volatile memory such as a one time programmable ROM (OTROM), a PROM, and EPROM, an EEPROM, a mask ROM, a flash ROM, a NAND flash memory, or a NOR flash memory, a flash drive such as an SSD, a compact flash (CF) card, and SD card, a Micro-SD card, a Mini-SD card, and Xd card, or a memory stick, or a storage device such as an HDD.

The controller 270 may determine at least one executable operation of the AI device 200 based on information determined or generated by using a data analysis algorithm or a machine learning algorithm. In addition, the controller 270 may control components of the AI device 200 to perform the determined operation.

To this end, the controller 270 may request, retrieve, receive, or use data of the learning processor 230 or the storage 260, and may control components of the AI device 200 to execute a predicted operation or an operation determined to be preferable of the at least one executable operation.

In this case, when it is required to be linked with the external device to perform the determined operation, the controller 270 generates a control signal for controlling the corresponding external device, and transmits the generated control signal to the corresponding external device.

The controller 270 may obtain intent information about a user input, and may determine a requirement of a user based on the obtained intent information. In this case, the controller 270 may obtain the intent information corresponding to the user input using at least one of a speech-to-text (STT) engine for converting inputted speech into text strings or a natural language processing (NLP) engine for obtaining intent information of natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 230, trained by a learning processor of an AI server, or trained by distributed processing thereof.

The controller 270 collects history information including, for example, operation contents and user feedback on an operation of the AI device 200, and stores the history information in the storage 260 or the learning processor 230, or transmits the history information to an external device such as an AI server. The collected history information may be used to update a trained model.

The controller 270 may control at least some of components of the AI device 200 to drive an application stored in the storage 260. Furthermore, the controller 270 may operate two or more components included in the AI device 200 in combination with each other to drive the application.

It should be appreciated that in some embodiments, the controller 270 may be implemented by one or more integrated circuits, at least in part. Also, the controller 270 may be implemented as CPUs, ASICs, FPGAs, microprocessors, and the like.

The automatic labeling apparatus 280 for object recognition may include a transceiver, one or more processors, and a memory. The transceiver may be included in the input interface 220, the one or more processors may be included in the controller 270, and the memory may be included in the storage 260.

Also, AI device 200 may include any suitable type of communication transceivers, including a wireless transceiver for communication via a wireless network and/or a wired transceiver for wired communication.

The wireless transceiver may be any type of transceiver configured to communicate via a wireless network, such as a wireless wide-area network (WWAN), a wireless local-area network (WLAN), and a wireless personal-area network (wireless PAN), each of which may be configured in part or entirely as infrastructure, ad-hoc, or mesh networks. For example, the wireless transceiver can be implemented as a short-range wireless transceiver to communicate over a wireless personal-area-network (PAN) in accordance with a Bluetooth™ and/or Bluetooth™ low energy (BTLE) protocol. The Bluetooth™ family of protocols support various communication profiles for communicating various types of data and/or enabling different feature sets between devices connected for communication via a wireless PAN.

The wired transceiver may include wired data interfaces for communicating with other devices, such as an Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Figure 3:
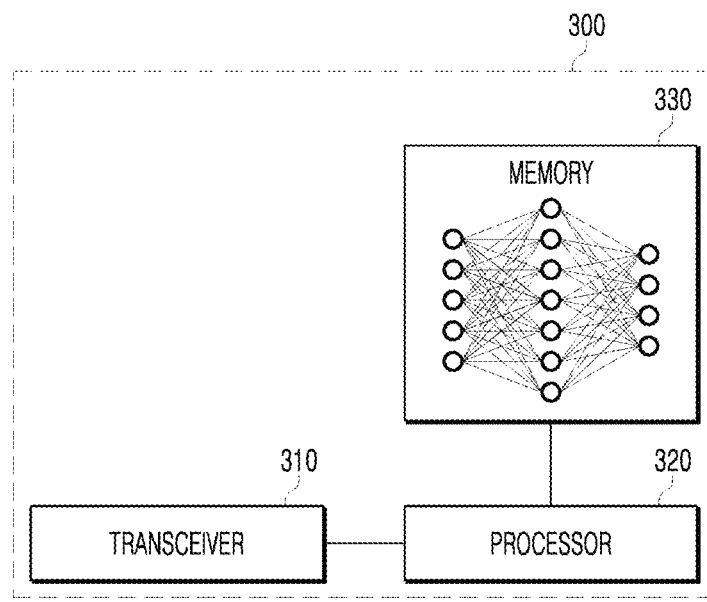
FIG. 3 is a diagram illustrating the configuration of the automatic labeling apparatus for object recognition according to an exemplary embodiment of the present disclosure.

FIG. 3 is a diagram illustrating the configuration of the automatic labeling apparatus for object recognition according to an exemplary embodiment of the present disclosure.

Referring to FIG. 3, an automatic labeling apparatus 300 for object recognition according to an embodiment of the present disclosure may include a transceiver 310, a processor 320, and a memory 330.

The transceiver 310 may receive a plurality of image frames (or images).

The processor 320 may apply an object recognition algorithm to each of the received image frames so as to recognize an object. That is, the processor 320 may perform image recognition on the received plurality of image frames using an object recognition algorithm. The object recognition algorithm may be a neural network model which is pre-trained to recognize an object in a plurality of image frames.

In response to the processor 320 determining that the object recognition result in the first image frame corresponds to the predetermined error condition, the processor 320 may automatically generate a data set on an object, which is a target of object recognition, by using an object recognition result of a second image frame other than the first image frame among the image frames and an object image in the first image frame. That is, the processor 320 may determine that an object recognition result for a first image frame of the received plurality of image frames includes a predetermined error condition, where a target object is recognized in a second image frame of the received plurality of image frames. The processor 320 may generate a data set on the target object using the first image frame and the object recognition result of the second image frame.

The processor 320 may determine whether an object recognition result in at least one first image frame among the image frames corresponds to a predetermined error condition. As the object recognition result for the first image frame, the processor 320 may determine that the object recognition result for the first image frame includes the predetermined error condition, based on a confirmation that (i) an object not being recognized in the first image frame, (ii) a type of object recognized in the first image frame being different from a type of object recognized in each of the image frames received a predetermined time before or after the first image frame, or (iii) an object recognition reliability of the target object recognized from the first image frame being less than a predetermined reference value.

That is, the processor 320 may estimate the object recognition result of the first image frame in which the object is not successfully recognized, by using the object recognition result of the second image frame in which the object is successfully recognized.

Upon generating the data set on the object, the processor 320 may define the data set on the object, which is the target of object recognition, as a pair of an input value and a target output value. The processor 320 may set the input value as an object image in the first image frame, and set the target output value as a type of the object recognized from the second image frame. That is, the generated data set comprises a paired input value and target output value, the input value being an image of the target object in the first image frame and the target output value being a label of a type of the target object recognized in the second image frame.

The second image frame is included in a subset of the received plurality of images, where the target object is recognized in each of the subset for which no predetermined error is determined, and the object recognition reliability of the target object recognition in the second image frame may be greater than or equal to a predetermined reference value (for example, 90%). That is, an object recognition reliability of the target object recognition in each of the subset may be greater than or equal to a predetermined reference value. A type of the object may be the same in the object recognition result of each second image frame. That is, a type of the target object recognized in each of the subset is the same.

The processor 320 may estimate a location of a predicted region in which the object is predicted to exist in the first image frame, and more accurately generate the data set on the object by using an object image of the estimated predicted region. For example, when the object is a moving 'human,' the processor 320 may accurately set the object image in the first image frame as an input value included in the data set, by using the predicted region.

The processor 320 may estimate the location of the predicted region in which the object is predicted to exist in the first image frame based on a location of a first region in which the object is recognized from the second image frame received a predetermined first time before the first image frame and a location of a second region in which the object is recognized from the second image frame received a predetermined second time set after the first image frame. The processor 320 may determine a predicted region of the target object in the first image frame based on a first region of the target object recognized in a previous image frame and a second region of the target object recognized in a next image frame. The previous image frame may be included in the subset and is received prior to the first image frame by a predetermined first time, and the next image frame may be included in the subset and is received after the first image frame by a predetermined second time. The first region may be polygonal (for example, a square), but is not limited thereto, and may also be circular, for example. When the first region is square shaped, for example, the location of the first region may be represented by a distance between a first reference point in the second image frame and a second reference point in the first region, a horizontal length, and a vertical length of the first region. In addition, the location of the first region in the second image frame may be represented by coordinates of the vertices of the region, based on a random reference point in the image frame.

Specifically, based on a ratio of the first time to the second time, the processor 320 may estimate, as the location of the predicted region, a location of a region at a point located at a distance corresponding to the ratio of the first time to the second time in the distance between the first region and the second region, selected from among points that connect the gap between the location of the first region and the location of the second region. The processor 320 may determine the predicted region by determining a ratio of a first time period between the predetermined first time to a time of receiving the first image frame and a second time period between the time of receiving the first image frame and the predetermined second time and identifying a point within the first image frame located at a distance between corresponding points of the first region and the second region corresponding to the determined ratio. For example, in response to the processor 320 determining that the first time is the same as the second time, the processor 320 may estimate, as the location of the predicted region, a location of a region at a point located at a distance corresponding to the middle of the distance between the first region and the second region, selected from points that connect the gap between the location of the first region and the location of the second region. When the ratio of the first time to the second time is 1:2, the processor 320 may estimate, as the location of the predicted region, a location of a region at a point located at a distance corresponding to the ratio of 1:2 in the distance between the first region and the second region, selected from the points that connect the gap between the location of the first region and the location of the second region.

As another example of generating a data set on the object, the processor 320 may set the input value as an object image of the predicted region in the first image frame, and set the target output value designated by a label as a type of the object recognized from the second image frame, so as to more accurately generate a data set on the object even when the object moves. That is, the generated data set may comprise a paired input value and target output value, the input value being an image of the target object in the predicted region of the first image frame and the target output value being a label of a type of the target object recognized in the second image frame.

The processor 320 may store the generated data set in the memory 330, and update the object recognition algorithm based on the generated data set stored in the memory, thereby reducing an error rate of new image frames which are subsequently received and increasing the object recognition reliability to more than a predetermined reference value.

In response to a determination that object recognition results for a predetermined number or more of consecutive image frames of the received plurality of image frames include a predetermined error condition, the processor 320 transmits the generated data set to a server, and updates the object recognition algorithm in the server based on the data set. Thereafter, the processor 320 may receive the updated object recognition algorithm from the server for replacing the object recognition algorithm. The updated object recognition algorithm is updated based on the transmitted generated data set. By enabling the server to perform a process of updating the object recognition algorithm, the processor 320 may reduce the computation amount or the energy used in the update and more rapidly update the object recognition algorithm.

The memory 330 may store a neural network model which is pre-trained to recognize an object in a plurality of image frames. The neural network model may be received from a server (for example, YOLO network server) through the transceiver 310, and stored in the memory 330 by the processor 320 or stored in the memory 330 in advance.

Moreover, the memory 330 may further store the generated data set on the object. The memory 330 may store only a data set relevant to the first image frame corresponding to an error condition, thereby reducing the size of the data set stored in the memory 330. The data set relevant to the first image frame corresponding to the error condition may include an object image in the first image frame as an input value, and a type of the object (that is, a type of the object recognized from the second image frame), which is expected to be recognized from the first image frame, as a target output value.

According to an embodiment of the present disclosure, the automatic labeling apparatus 300 for object recognition may utilize the automatically generated data set on the object in transfer learning for generating a previous object recognition algorithm, but is not limited thereto, and may utilize the data set in transfer learning retraining or transfer learning fine tuning.

Figure 4:
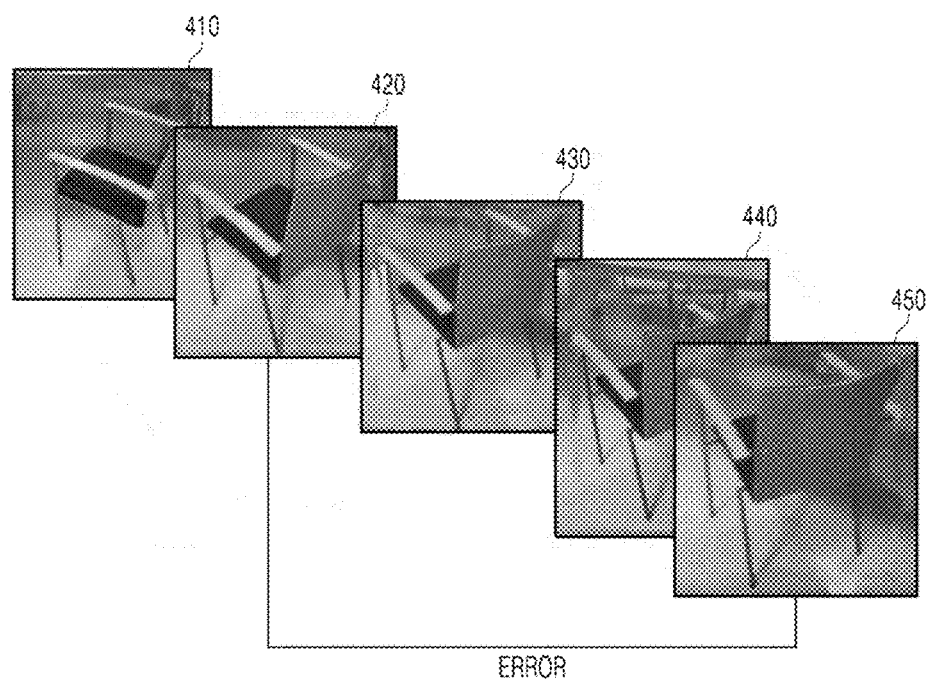
FIG. 4 is a diagram illustrating an example of automatic labeling in the automatic labeling apparatus for object recognition according to an exemplary embodiment of the present disclosure.

FIG. 4 is a diagram illustrating an example of automatic labeling in the automatic labeling apparatus for object recognition according to an exemplary embodiment of the present disclosure.

Referring FIG. 4, the automatic labeling apparatus for object recognition may recognize an object by applying an object recognition algorithm to each of a plurality of image frames. In response to the automatic labeling apparatus for object recognition determining that an object recognition result in at least one first image frame among the image frames corresponds to a predetermined error condition, the automatic labeling apparatus for object recognition may automatically generate a data set on an object, which is a target of object recognition, by using an object recognition result of a second image frame other than the first image frame among the image frames and an object image in the first image frame.

Specifically, the automatic labeling apparatus for object recognition may determine that the object recognition result in the first image frame corresponds to the predetermined error condition in response to the object not being recognized from the first image frame. For example, the automatic labeling apparatus for object recognition may receive five image frames, such as an image frame_#1 410, an image frame_#2 420, an image frame_#3 430, an image frame_#4 440 and an image frame_#5 450, and apply an object recognition algorithm to each of the five image frames 410~450 so as to recognize the object in the image frames.

The automatic labeling apparatus for object recognition may recognize a 'chair' as the type of the object from the image frame_#1 410, the image frame_#3 430, and the image frame_#4 440.

However, in response to the 'chair' not being recognized from the image frame_#2 420, the automatic labeling apparatus for object recognition may determine that the object recognition result in the image frame_#2 420 corresponds to the predetermined error condition.

In response to the type of the object recognized from the first image frame being different from the type of the object recognized from each of the image frames received a predetermined time before or after the first image frame, the automatic labeling apparatus for object recognition may determine that the object recognition result in the first image frame corresponds to the predetermined error condition. For example, in response to a 'chair' being recognized from the image frame_#1 410 received before the image frame_#2 420 and the 'chair' also being recognized from the image frame_#3 430 received after the image frame_#2 420, but a 'table' being recognized from the image frame_#2 420, the automatic labeling apparatus for object recognition may determine that the object recognition result in the image frame_#2 420 corresponds to the predetermined error condition.

As another example of the error condition, the automatic labeling apparatus for object recognition may determine that the object recognition result in the first image frame corresponds to the predetermined error condition in response to object recognition reliability recognized from the first image frame being less than a predetermined reference value. For example, in response to the 'chair' being recognized from the image frame_#5 450 but the object recognition reliability of the recognized 'chair' being confirmed to be 30%, which is less than the predetermined reference value of 90%, the automatic labeling apparatus for object recognition may determine that the object recognition result in the image frame_#5 450 corresponds to the predetermined error condition.

Accordingly, in response to the automatic labeling apparatus for object recognition determining that the image frame_#2 420 and the image frame_#5 450 correspond to the predetermined error condition, the automatic labeling apparatus for object recognition may automatically generate a data set on the object, which is a target of object recognition, by using the object recognition results of the image frame_#1 410, the image frame_#3 430, and the image frame_#4 440 (for example, the 'chair' being recognized with object recognition reliability of more than 90%) other than the image frame_#2 420 and the image frame_#5 450.

Here, the automatic labeling apparatus for object recognition may define the data set on the object as a pair of an input value and an output value. The automatic labeling apparatus for object recognition may generate an additional data set on the object by setting the input value as an object image in the image frame_#2 420, that is, 'a second chair image,' and the target output value designated by a label as a type of the object, that is, a 'chair' recognized from adjacent image frames such as the image frame_#1 410 and the image frame_#3 430 (or the image frame_#1 410, the image frame_#3 430, and the image frame_#4 440). The automatic labeling apparatus for object recognition may generate an additional data set on the object by setting the input value as an object image in the image frame_#5 450, that is, 'a fifth chair image,' and the target output value designated by a label as a type of the object, that is, a 'chair' recognized from the image frame_#1 410, the image frame_#3 430, and the image frame_#4 440.

Thereafter, the automatic labeling apparatus for object recognition may update an object recognition algorithm by using the additional data set. As a result, the automatic labeling apparatus for object recognition may enable recognition of the 'chair' as a type of the object from a new image frame without any errors by using the updated object recognition algorithm, even when a new image frame which is the same as the image frame_#2 420 and the image frame_#5 450 is subsequently received.

Figure 5:
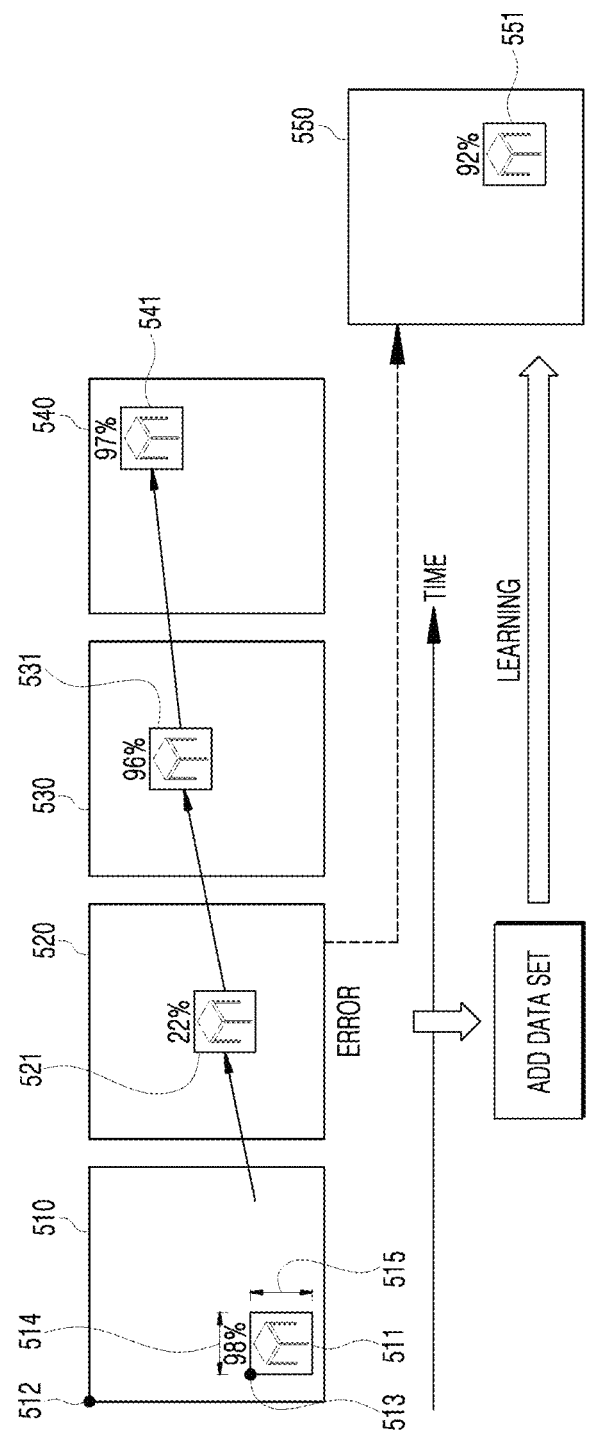
FIGS. 5 and 6 are diagrams illustrating an example of automatic labeling in the automatic labeling apparatus for object recognition according to an exemplary embodiment of the present disclosure.
Figure 6:
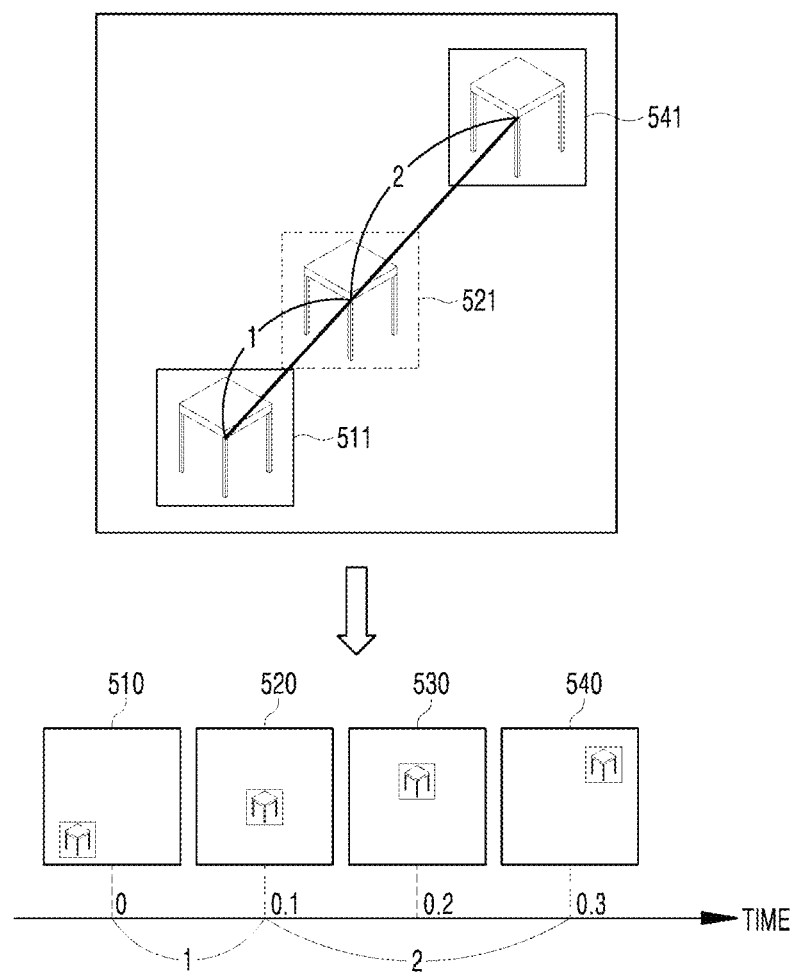

FIGS. 5 and 6 are diagrams illustrating an example of automatic labeling in the automatic labeling apparatus for object recognition according to an exemplary embodiment of the present disclosure.

Referring to FIG. 5, in response to the automatic labeling apparatus for object recognition determining that an object recognition result in at least one first image frame among the image frames corresponds to a predetermined error condition, the automatic labeling apparatus for object recognition may automatically generate a data set on the object, which is a target of object recognition, by using an object recognition result of a second image frame other than the first image frame among the image frames and an object image in the first image frame.

For example, the automatic labeling apparatus for object recognition may receive four image frames, such as an image frame_#1 510, an image frame_#2 520, an image frame_#3 530, and an image frame_#4 540, and apply an object recognition algorithm to each of the four image frames 510 to 540 so as to recognize an object in the four image frames 510 to 540.

Here, the automatic labeling apparatus for object recognition may recognize a 'table' as the type of object in a first region 511 of the image frame_#1 510, and a 'table' as the type of object in a second region 531 of the image frame_#3 530. Also, the automatic labeling apparatus for object recognition may recognize a 'table' as the type of object in a first region 541 of the image frame_#4 540.

However, in response to a 'table' not being detected from the image frame_#2 520, the automatic labeling apparatus for object recognition may determine that the object recognition result in the image frame_#2 520 corresponds to the predetermined error condition.

In response to the automatic labeling apparatus for object recognition determining that the image frame_#2 520 corresponds to the predetermined error condition, the automatic labeling apparatus for object recognition may automatically generate a data set on the object, which is a target of object recognition, by using the object recognition results of the image frame_#1 510 and the image frame_#3 530 (for example, the 'table' in the first and second regions of each image frame being recognized with an object recognition reliability of more than 90%) other than the image frame_#2. For example, the image frame_#1 510 may be received '0.1' seconds before the image frame_#2 520, and the image frame_#3 530 may be received '0.1' seconds after the image frame_#2 520.

Here, the automatic labeling apparatus for object recognition may define the data set on the object as a pair of an input value and a target output value. Specifically, the automatic labeling apparatus for object recognition may set the input value as the image frame_#2 520, and set the target output value designated by a label as a type of the object, that is, a 'table' recognized from each of the image frame_#1 510 and the image frame_#3 530.

The automatic labeling apparatus for object recognition may estimate a location of a predicted region 521 in which the object is predicted to exist in the image frame_#2 520, based on a location of a region_#1 511 in which the 'table' is recognized from the image frame_#1 510 and a location of a region_#3 531 in which the 'table' is recognized from the image frame_#3 530. Here, in response to the image frame_#1 510, the image frame_#2 520, and the image frame_#3 530 being received at the same interval of '0.1' seconds, the automatic labeling apparatus for object recognition may estimate, as the location of the predicted region 521 in which the object is predicted to exist in the image frame_#2 520, a location of a region at a point located at a distance corresponding to the middle of the distance between the first region and the second region, selected from points that connect the gap between the first region_#1 511 and the second region_#3 531.

A region in which an object is recognized in the image frame may, for example, be square shaped. Here, the location of the region in the image frame may be represented by a distance between a first reference point in the image frame and a second reference point of the region, a horizontal length, and a vertical length of the region. In addition, the location of the region in the image frame may also be represented by the coordinates of the vertices of the region in the image frame. For example, the location of the first region_#1 511 in which the 'table' is recognized in the image frame_#1 510 may be represented by a distance between a first reference point 512 of the image frame_#1 510 and a second reference point 513 of the first region_#1 511, a horizontal length 514, and a vertical length 515 of the first region_#1 511.

However, when the object recognition result in the image frame_#3 530 corresponds to the predetermined error condition, as shown in FIG. 6, the automatic labeling apparatus for object recognition may automatically generate a data set on the object, which is a target of object recognition, by using the image frame_#1 510 and the image frame_#4 540. For example, the image frame_#1 510 may be received '0.1 seconds' before the image frame_#2 520, and the image frame_#4 540 may be received '0.2 seconds' after the image frame_#2 520.

Here, the automatic labeling apparatus for object recognition may estimate a location of the predicted region 521 in which the object is predicted to exist in the image frame_#2 520 based on a ratio of the time when the image frame_#1 510 is received to the time when the image frame_#4 540 is received, with respect to the image frame_#2 520. Specifically, the automatic labeling apparatus for object recognition may estimate, as the location of the predicted region 521 in which the object is predicted to exist in the image frame_#2 520, a location at a point located at a distance corresponding to the ratio of the time when the image frame_#1 510 is received to the time when the image frame_#4 540 is received in the distance between the region_#1 511 and the region_#4 541, selected from points that connect the gap between the location of the region_#1 511 in the image frame_#1 510 and the location of the region_#4 541 in which a 'table' is recognized from the image frame_#4 540. That is, based on a ratio of '0.1 seconds' to '0.2 seconds,' the automatic labeling apparatus for object recognition may estimate, as the location of the predicted region 521 in the image frame_#2 520, a location at a point located at a distance corresponding to the ratio of 1:2 in the distance between the region_#1 511 and the region_#4 541, selected from the points that connect the gap between the location of the region_#1 511 and the location of the region_#4.

That is, the automatic labeling apparatus for object recognition may set the input value as an object image, that is, 'a second table image' of the predicted region in the image frame_#2 520, and set the target output value as a type of the object, that is, a 'table' recognized from the image frame_#1 510 and the image frame_#4 540, respectively, thereby more accurately generating an additional data set on the object even when the object moves.

Thereafter, the automatic labeling apparatus for object recognition may update the object recognition algorithm by using the additional data set. As a result, the automatic labeling apparatus for object recognition may enable recognition of the 'table' as a type of the object at a location of a predicted region 551 from a new image frame without any errors by using the updated object recognition algorithm, even when a new image frame 550 which is the same as the image frame_#2 520 is subsequently received.

Figure 7:
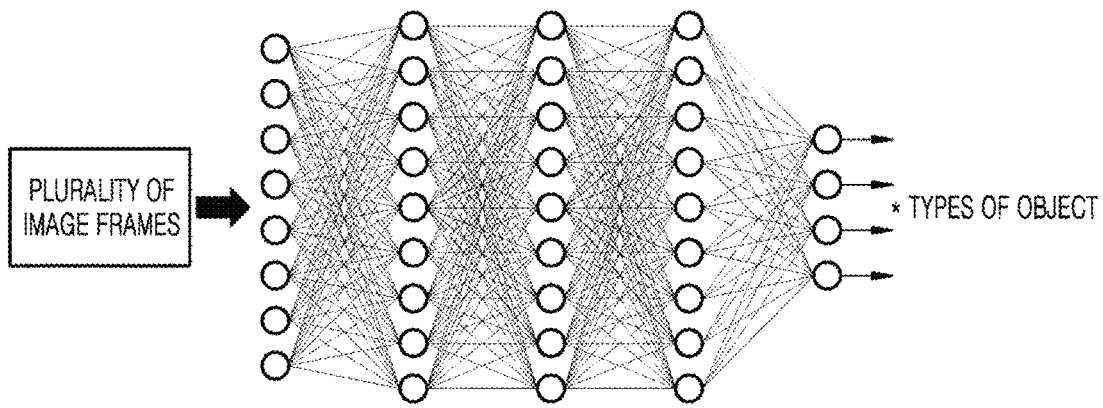
FIG. 7 is a diagram illustrating a neural network model for recognizing an object from an image frame in the automatic labeling apparatus of object recognition according to an exemplary embodiment of the present disclosure.

FIG. 7 is a diagram illustrating a neural network model for recognizing an object from an image frame in the automatic labeling apparatus of object recognition according to an exemplary embodiment of the present disclosure.

Referring to FIG. 7, the automatic labeling apparatus for object recognition may use an object recognition algorithm in order to recognize an object from a plurality of image frames. Here, the object recognition algorithm may be a deep neural network model trained through machine learning of artificial intelligence so as to recognize an object from various image frames.

Artificial intelligence (AI) is an area of computer engineering science and information technology that studies methods to make computers mimic intelligent human behaviors such as reasoning, learning, self-improving, and the like.

In addition, AI does not exist on its own, but is rather directly or indirectly related to a number of other fields in computer science. Particularly in recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer is a layer that accepts external data, the number of neurons in the Input layer is equal to the number of input variables, and the hidden layer is disposed between the input layer and the output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function A deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms of an ANN may be classified into supervised learning, unsupervised learning, semi-supervised learning, and reinforcement learning.

Supervised learning is a machine learning method that derives a single function from the training data.

Among the functions thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

One semi-supervised learning technique involves inferring the label of unlabeled training data, and then using this inferred label for learning. This technique may be used advantageously when the cost associated with the labeling process is high.

Reinforcement learning may be based on a theory that given the condition under which a reinforcement learning agent may determine what action to choose at each time instance, the agent may fine an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-latch size, iteration number, learning rate, and so forth. Furthermore, the model parameters may include a weight between nodes a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nada may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

While there may be various methods for generating a deep neural network model for use in an embodiment of the present disclosure, in the case of supervised learning, the following training process may be performed as a preliminary work.

Accordingly, the automatic labeling apparatus for object recognition according to an embodiment of the present disclosure may define a data set on an object as a pair of an input value and a target output value, set an object image in various image frames as the input value, and set a type of the object in the image frame as the target output value. Further, the automatic labeling apparatus for object recognition may train a deep neural network model using the data set on the object to train in advance a neural network model capable of recognizing an object from received image frames, or may receive a pre-trained neural network model from an external server and store the model in a memory.

Figure 8:
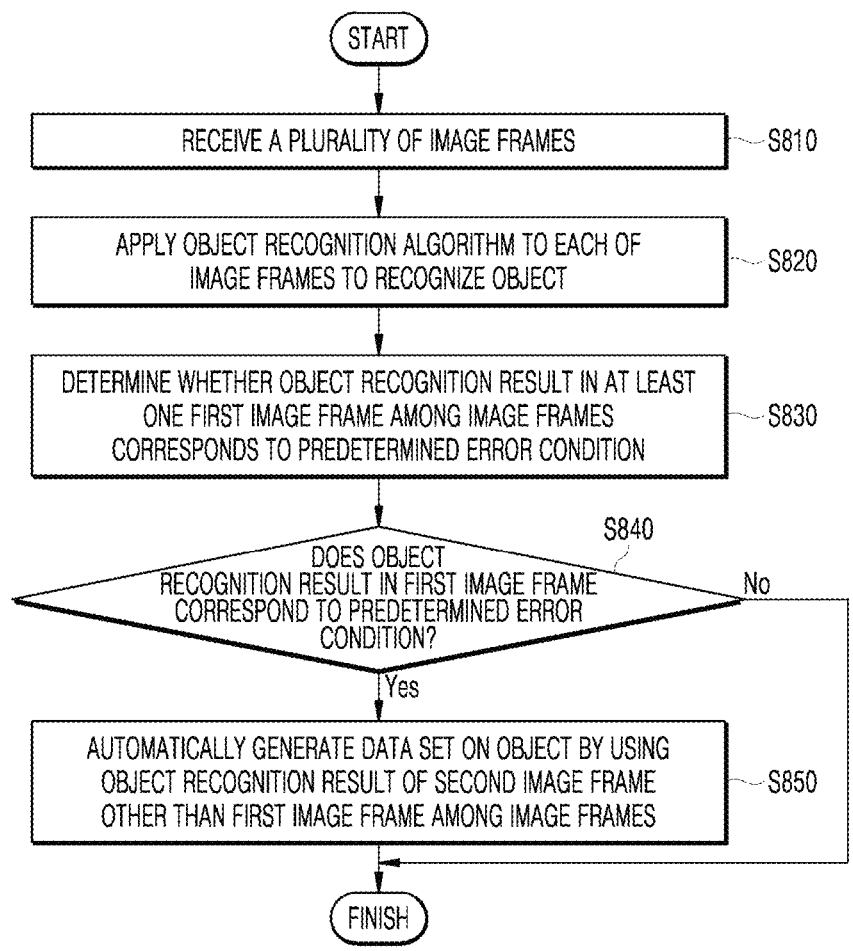
FIG. 8 is a flow diagram illustrating an automatic labeling method for object recognition according to an exemplary embodiment of the present disclosure.

FIG. 8 is a flow diagram illustrating an automatic labeling method for object recognition according to an exemplary embodiment of the present disclosure. The automatic labeling apparatus for object recognition to implement the automatic labeling method for object recognition according to the present disclosure may store a neural network model that is pre-trained to recognize an object from a plurality of image frames, as an object recognition algorithm applied to the image frames to recognize the object.

Referring to FIG. 8, in Step S810, the automatic labeling apparatus for object recognition may receive a plurality of image frames.

In Step S820, the automatic labeling apparatus for object recognition may apply an object recognition algorithm to each of the received image frames so as to recognize an object.

The automatic labeling apparatus for object recognition may determine that an object recognition result for a first image frame of the received plurality of image frames includes a predetermined error condition, where a target object is recognized in a second image frame of the received plurality of image frames. The automatic labeling apparatus for object recognition may generate a data set on the target object using the first image frame and the object recognition result of the second image frame.

In Step S830, specifically, the automatic labeling apparatus for object recognition may determine whether an object recognition result in at least one first image frame among the image frames corresponds to a predetermined error condition.

Here, in response to the object not being recognized in the first image frame, the automatic labeling apparatus for object recognition may determine that the object recognition result for the first image frame includes the predetermined error condition.

The automatic labeling apparatus for object recognition may determine that the object recognition result corresponds to the predetermined error condition in response to a type of the object recognized from the first image frame being different from that of the object recognized from each of the image frames received a predetermined time before or after the first image frame (or an image frame received within a time interval set based on the first image frame).

Further, the automatic labeling apparatus for object recognition may determine that the object recognition result in the first image frame corresponds to the predetermined error condition by confirming that an object recognition reliability of the target object recognized in the first image frame being less than a predetermined reference value.

In response to the automatic labeling apparatus for object recognition determining that the object recognition result in the first image frame corresponds to the predetermined error condition in step S840, in step S850 the automatic labeling apparatus for object recognition may automatically generate a data set on the object, which is a target of object recognition, by using an object recognition result of a second image frame other than the first image frame among the image frames and an object image in the first image frame. Here, the second image frame is included in a subset of the received plurality of images, where the target object is recognized in each of the subset for which no predetermined error is determined, and the object recognition reliability of the target object recognition in the second image frame may be greater than or equal to a predetermined reference value (for example, 90%). That is, an object recognition reliability of the target object recognition in each of the subset may be greater than or equal to a predetermined reference value. A type of the object may be the same in the object recognition result of each second image frame. That is, a type of the target object recognized in each of the subset is the same.

That is, the automatic labeling apparatus for object recognition may estimate an object recognition result of the first image frame in which the object is not successfully recognized, by using the object recognition result of the second image frame in which the object is successfully recognized.

Upon generating the data set of the object, the automatic labeling apparatus for object recognition may define the data set of the object, which is a target of the object recognition, as a pair of an input value and a target output value. Here, the automatic labeling apparatus for object recognition may set the input value as an object image in the first image frame, and set the target output value designated by a label as a type of the object recognized from the second image frame. That is, the generated data set comprises a paired input value and target output value, the input value being an image of the target object in the first image frame and the target output value being a label of a type of the target object recognized in the second image frame.

The automatic labeling apparatus for object recognition may estimate a location of a predicted region in which the object is predicted to exist in the first image frame to thereby more accurately generate the data set on the object by using the object image of the estimated predicted region.

When estimating the predicted region, the automatic labeling apparatus for object recognition may estimate a location of the region in which the object is predicted to exist in the first image frame, based on a location of a first region in which the object is recognized from the second image frame received a predetermined first time before the first image frame and a location of a second region in which the object is recognized from the second image frame received a predetermined second time after the first image frame. The automatic labeling apparatus for object recognition may determine a predicted region of the target object in the first image frame based on a first region of the target object recognized in a previous image frame and a second region of the target object recognized in a next image frame. The previous image frame may be included in the subset and is received prior to the first image frame by a predetermined first time, and the next image frame may be included in the subset and is received after the first image frame by a predetermined second time.

Based on a ratio of the first time to the second time, the automatic labeling apparatus for object recognition may estimate, as a location of the predicted region, a location of a region at a point located at a distance corresponding to the ratio of the first time to the second time in the distance between the first region and the second region, selected from among points that connect the gap between the location of the first region and the location of the second region. The automatic labeling apparatus for object recognition may determine the predicted region by determining a ratio of a first time period between the predetermined first time to a time of receiving the first image frame and a second time period between the time of receiving the first image frame and the predetermined second time and identifying a point within the first image frame located at a distance between corresponding points of the first region and the second region corresponding to the determined ratio.

As another example of generating the data set on the object, the automatic labeling apparatus for object recognition may set the input value as an object image of the predicted region from the first image frame, and set the target output value designated by a label as a type of the object recognized from the second image frame, thereby more accurately generating the data set on the object. That is, the generated data set may comprise a paired input value and target output value, the input value being an image of the target object in the predicted region of the first image frame and the target output value being a label of a type of the target object recognized in the second image frame.

Thereafter, the automatic labeling apparatus for object recognition may update the object recognition algorithm based on the generated data set on the object. As a result, the automatic labeling apparatus for object recognition may reduce the error rate of new image frames which are subsequently received and increase the object recognition reliability to more than a predetermined reference value.

In response to a determination that the object recognition results for a predetermined number or more of consecutive image frames of the received plurality of image frames include a predetermined error condition, the automatic labeling apparatus for object recognition may update the object recognition algorithm by using a server that communicates with the automatic labeling apparatus for object recognition. Here, the automatic labeling apparatus for object recognition transmits the generated data set to a server, thereby updating the object recognition algorithm in the server based on the data set. Thereafter, the automatic labeling apparatus for object recognition may receive the updated object recognition algorithm from the server, and substitute the object recognition algorithm with the updated object recognition algorithm. By enabling the server to perform a process of updating the object recognition algorithm the automatic labeling apparatus for object recognition can reduce the computation amount or the energy used in the update and more rapidly update the object recognition algorithm.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code included both machine codes, such as produced by a complier, and higher level code that may be executed by the computer using an interpreter.

As used in the present disclosure (particularly in the appended claims), the singular forms "a," "an" and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An apparatus for object recognition, the apparatus comprising:
a receiver configured to receive a plurality of image frames; and
one or more processors configured to:
perform image recognition on the received plurality of image frames using an object recognition algorithm;
determine that an object recognition result for a first image frame of the received plurality of image frames includes a predetermined error condition, where a target object is recognized in a second image frame of the received plurality of image frames; and
generate a data set on the target object using the first image frame and the object recognition result of the second image frame,
wherein the object recognition algorithm includes a neural network model which is trained to recognize objects in images,
wherein an object recognition reliability of the target object recognition in the second image frame is greater than or equal to a predetermined reference value, and
wherein the generated data set comprises a paired input value and target output value, the input value being an image of the target object in the first image frame and the target output value being a label of a type of the target object recognized in the second image frame.

2. The apparatus according to claim 1, wherein one or more processors are further configured to determine that the object recognition result for the first image frame includes the predetermined error condition based on:
an object not being recognized in the first image frame;
a type of object recognized in the first image frame being different from a type of object recognized in each of the image frames received a predetermined time before or after the first image frame; or
an object recognition reliability of the target object recognized in the first image frame being less than a predetermined reference value.

3. The apparatus according to claim 1,
wherein the second image frame is included in a subset of the received plurality of images, where the target object is recognized in each of the subset for which no predetermined error is determined,
wherein an object recognition reliability of the target object recognition in each of the subset is greater than or equal to a predetermined reference value, and
wherein a type of the target object recognized in each of the subset is the same.

4. The apparatus according to claim 3, wherein the one or more processors are further configured to determine a predicted region of the target object in the first image frame based on a first region of the target object recognized in a previous image frame and a second region of the target object recognized in a next image frame,
wherein the previous image frame is included in the subset and is received prior to the first image frame by a predetermined first time, and
wherein the next image frame is included in the subset and is received after the first image frame by a predetermined second time.

5. The apparatus according to claim 4, wherein the generated data set comprises a paired input value and target output value, the input value being an image of the target object in the predicted region of the first image frame and the target output value being a label of a type of the target object recognized in the second image frame.

6. The apparatus according to claim 4, wherein the one or more processors are further configured to determine the predicted region by:
determining a ratio of:
a first time period between the predetermined first time to a time of receiving the first image frame; and
a second time period between the time of receiving the first image frame and the predetermined second time; and
identifying a point within the first image frame located at a distance between corresponding points of the first region and the second region corresponding to the determined ratio.

7. The apparatus according to claim 1, wherein the one or more processors are further configured to store the generated data set in a memory and update the object recognition algorithm based on the generated data set.

8. The apparatus according to claim 1, wherein the one or more processors are further configured to:
transmit the generated data set to a server in response to a determination that object recognition results for a predetermined number or more of consecutive image frames of the received plurality of image frames include a predetermined error condition; and
receive an updated object recognition algorithm from the server for replacing the object recognition algorithm, wherein the updated object recognition algorithm is updated based on the transmitted generated data set.

9. A method for object recognition, the method comprising:
receiving a plurality of image frames;
performing image recognition on the received plurality of image frames using an object recognition algorithm;
determining that an object recognition result for at least a first image frame of the received plurality of image frames includes a predetermined error condition, where a target object is recognized in a second image frame of the received plurality of image frames; and
generate a data set on the target object using the first image frame and the object recognition result of the second image frame,
wherein the object recognition algorithm includes a neural network model which is trained to recognize objects in images,
wherein an object recognition reliability of the target object recognition in the second image frame is greater than or equal to a predetermined reference value, and
wherein the generated data set comprises a paired input value and target output value, the input value being an image of the target object in the first image frame and the target output value being a label of a type of the target object recognized in the second image frame.

10. The method according to claim 9, wherein the predetermined error of the object recognition result for the first image frame is determined based on:
an object not being recognized in the first image frame;
a type of object recognized from the first image frame being different from a type of object recognized from each of the image frames received a predetermined time before or after the first image frame; or
an object recognition reliability of the target object recognized in the first image frame being less than a predetermined reference value.

11. The method according to claim 9,
wherein the second image frame is included in a subset of the received plurality of images, where the target object is recognized in each of the subset for which no predetermined error is determined,
wherein an object recognition reliability of the target object recognition in each of the subset is greater than or equal to a predetermined reference value, and
wherein a type of the target object recognized in each of the subset is the same.

12. The method according to claim 11, further comprising determining a predicted region of the target object in the first image frame based on a first region of the target object recognized in a previous image frame and a second region of the target object recognized in a next image frame,
wherein the previous image frame is included in the subset and is received prior to the first image frame by a predetermined first time, and
wherein the next image frame is included in the subset and is received after the first image frame by a predetermined second time.

13. The method according to claim 12, wherein the generated data set comprises a paired input value and target output value, the input value being an image of the target object in the predicted region of the first image frame and the target output value being a label of a type of the target object recognized in the second image frame.

14. The method according to claim 12, wherein the determining the predicted region comprises:
determining a ratio of:
a first time period between the predetermined first time to a time of receiving the first image frame; and
a second time period between the time of receiving the first image frame and the predetermined second time; and
identifying a point within the first image frame located at a distance between corresponding points of the first region and the second region corresponding to the determined ratio.

15. The method according to claim 9, further comprising storing the generated data set in a memory and updating the object recognition algorithm based on the generated data.

16. The method according to claim 9, further comprising:
transmitting the generated data set to a server in response to a determination that object recognition results for a predetermined number or more of consecutive image frames of the received plurality of image frames include a predetermined error condition; and
receiving an updated object recognition algorithm from the server for replacing the object recognition algorithm, wherein the updated object recognition algorithm is updated based on the transmitted generated data set.

* * * * *